July 5, 1932. W. DE COURSEY 1,866,297
APPARATUS FOR PULVERIZING MATERIALS
Filed Oct. 23, 1926 3 Sheets-Sheet 1

Inventor:
WILLIAM DE COURSEY,
By John H. Bruninga
His Attorney

July 5, 1932.  W. DE COURSEY  1,866,297
APPARATUS FOR PULVERIZING MATERIALS
Filed Oct. 23, 1926   3 Sheets-Sheet 2
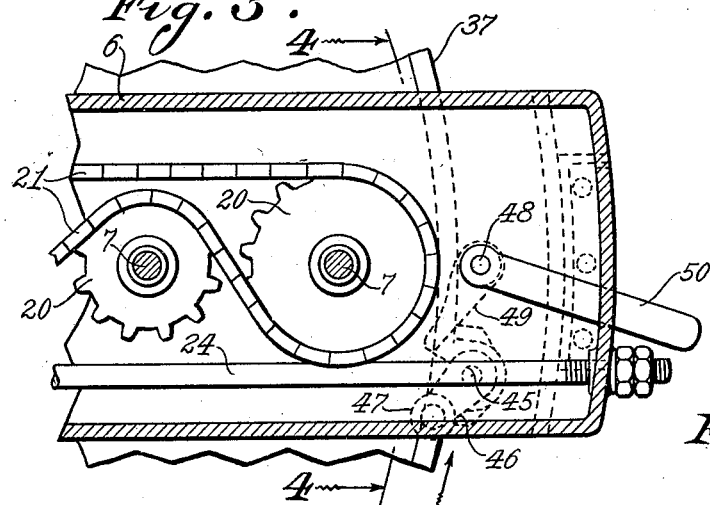
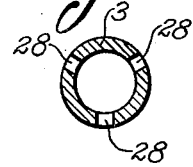
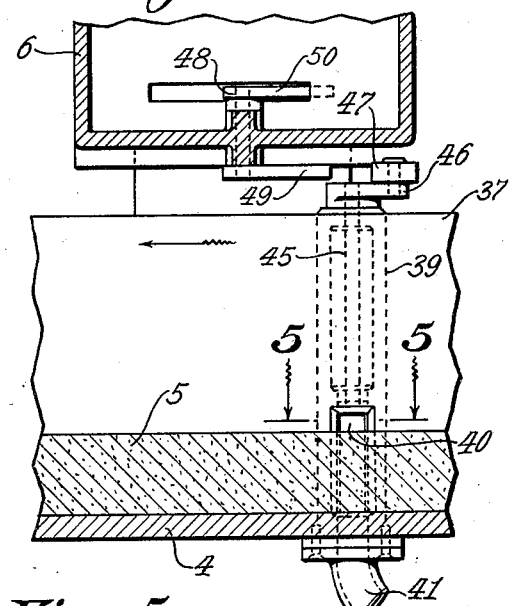
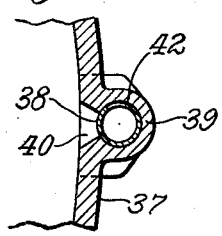
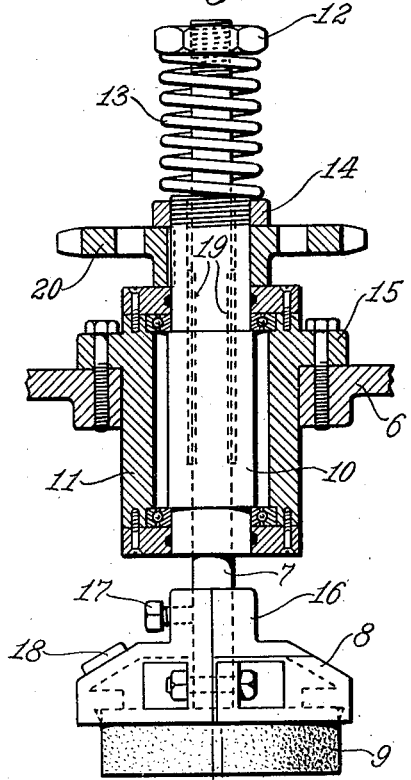
Inventor:
WILLIAM DE COURSEY,
By John W. Bruninga
His Attorney.

July 5, 1932.  W. DE COURSEY  1,866,297
APPARATUS FOR PULVERIZING MATERIALS
Filed Oct. 23, 1926   3 Sheets-Sheet 3

Patented July 5, 1932

1,866,297

UNITED STATES PATENT OFFICE

WILLIAM DE COURSEY, OF ST. LOUIS, MISSOURI

APPARATUS FOR PULVERIZING MATERIALS

Application filed October 23, 1926. Serial No. 143,599.

This invention pertains to pulverizers and more particularly to that type of pulverizer in which the material is ground wet.

One of the objects of this invention is to provide a construction for the grinding mechanism which will be capable of pulverizing the material to a greater degree of fineness and in a shorter time than has been possible heretofore.

Another object is to provide a construction in which the degree of fineness may be varied by adjustment of the grinding mechanism.

In grinders of this type, the construction often provides a rotating pan with a series of cooperating mullers, by the action of which the material is ground in the pan while wet with water or other suitable liquid. The motion of the pan and the mullers keeps the material in suspension in the liquid during operation. When it is desired to stop the operation, however, and the pan is brought to rest, the material settles out of the liquid and forms a hard cake in the pan. Before the operation can be resumed, therefore, this cake must be broken up and the material dug out of the pan.

Another object of this invention, therefore, is to provide means for draining the material out of the pan while the latter is still in motion so that it need not be brought to rest until empty and can, therefore, be again started up without the necessity of first digging out the material.

Another object is to provide improved means for continuous operation by providing for overflow of the liquid and the ground material while the pan is in motion.

Further objects will appear from the following description, taken in connection with the accompanying drawings, in which:

Figure 3 is an enlarged detail of Figure 1, showing the control mechanism for the drain valves;

Figure 4 is a section on line 4—4 of Figure 3;

Figure 5 is a detail section on line 5—5 of Figure 4;

Figure 6 is a cross section of the hollow shaft taken on line 6—6 of Figure 2;

Figure 7 is an enlarged sectional view of the demountable bearing for the muller shaft.

Figure 1:
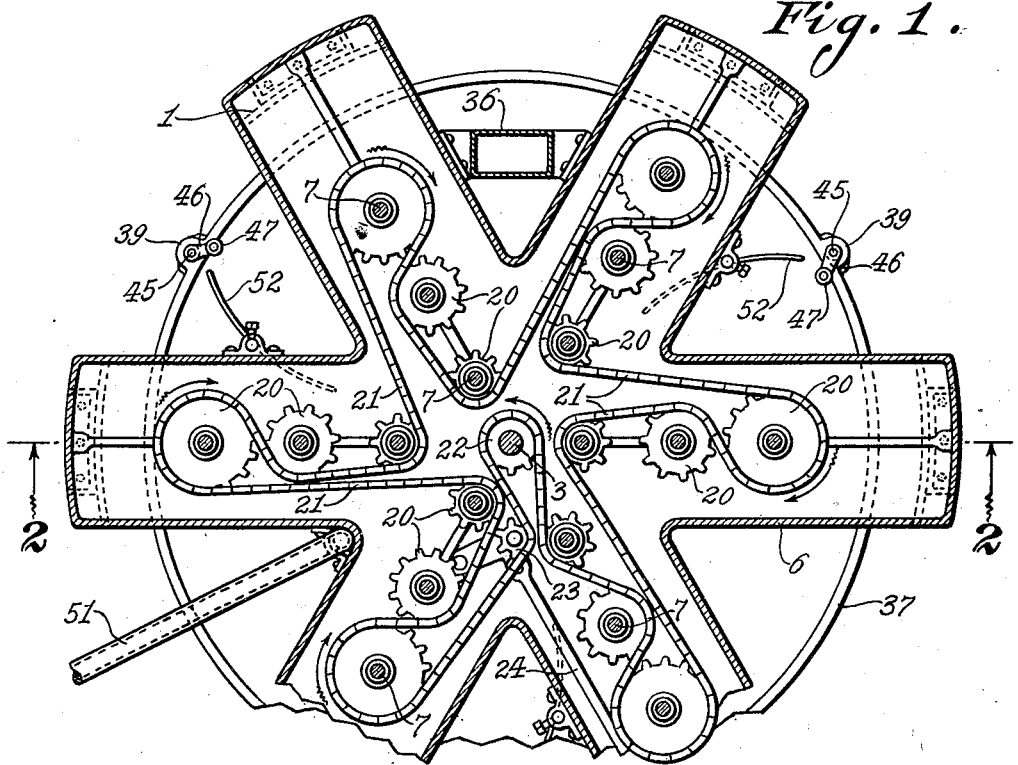
Figure 1 is a top view partly in section of a pulverizer embodying this invention, taken on line 1—1 of Figure 2.

Refering to the accompanying drawings, 1 designates a base or frame upon which the pulverizer is mounted. Mounted in suitable bearings 2 and 55 in the frame 1 is a hollow vertical shaft 3. Fixed on the shaft 3, so as to rotate therewith, is a pan 4. This pan is provided with a bottom plate or stone 5 of abrasive material, such as carborundum or the like.

Mounted in a spider 6, which is supported on the frame 1 over the top of the pan 4, are a series of muller shafts 7, each carrying at its lower end a head 8 in which is mounted a block 9 of abrasive material, such as carborundum or the like. Each shaft 7 is arranged to float in a sleeve 10, which in turn is mounted in a bearing 11. The shaft 7 passes upwardly through the sleeve 10 and is equipped at its upper end with an adjusting nut 12, which rests on a spring 13 surrounding the shaft 7 and resting at its lower end on a nut or collar 14 on the sleeve 10. The spring 13 is thus adapted to yieldingly support the weight of the muller, and its tension may be adjusted by means of the nut 12. The bearing 11 is arranged to fit through an opening in the spider 6 and is provided with a flange 15, which may be bolted to said spider so as to secure the bearing in place. In Figure 7 the flange 15 is shown above the spider 6, while in Figure 2 said flange is below the spider. Either construction may be used, according to the circumstances of the particular case.

The head 8 is provided with a hub 16 fitting the shaft 7 and adapted to be secured thereon by a set screw 17 or other suitable fastening. The head 8 is provided on its lower face with an eccentric socket adapted to receive the block 9. This socket is eccentric with respect to the center line of the head so that the axis A of the block 9 is offset laterally with respect to the axis B of the shaft 7. This arrangement provides for imparting an eccentric sweeping movement to the block 9 during the rotation of the shaft 7. A counterweight 18 is provided on the head 8 in a position opposite to the center line A so as to balance the weight of the block 9. This relieves any strain on the shaft 7 due to the unbalanced position of the block 9 and permits said shaft to run true in its bearing.

Each shaft 7 is splined to its sleeve 10 as indicated at 19 in Figure 7. This permits longitudinal movement of the shaft in the sleeve, but causes the shaft to rotate with the sleeve. Each sleeve is provided at its upper end with a sprocket 20. All of the sprockets 20 on the upper ends of the sleeves 10 are connected to be driven by a chain 21, which passes successively over each of said sprockets and also over a sprocket 22 on the upper end of the shaft 3. The chain 21, therefore, provides a driving connection by means of which all the muller shafts 7 are driven from the shaft 3. An idler sprocket 23, over which the chain 21 passes, is arranged to be moved by an adjusting rod 24, as shown in Figures 1 and 3, so as to adjust the tension of the chain 21.

The lower end of the shaft 3 has fixed thereto a bevel gear 25 meshing with a corresponding bevel gear 26 on a drive shaft 27, which may be driven from any suitable source of power not shown. When the shaft 3 is driven, it carries the pan 4 with it in rotation and also drives all of the mullers through the chain 21.

The shaft 3 is made hollow, as stated before, and is provided at a point just below the upper rim of the pan 4 with one or more ports 28, communicating with the interior bore thereof. These ports provide an overflow through which the pulverized material in suspension in the liquid may flow out of the pan, passing downwardly through the hollow shaft 3 and discharging into any suitable trough or receptacle 29.

The upper end of the shaft 3 may be equipped with a bevel gear 30 adapted to mesh with a corresponding gear 31 on a shaft 32 suitably journaled in a bracket or housing 33 and carrying at its end a pulley or crank 34 adapted to drive by means of a belt 35 or other suitable connection a feeder 36 (see Figure 8) of any suitable type.

The upstanding rim 37 of the pan 4 is equipped at intervals therearound with drain valves 38. These may be constructed as shown in detail in Figures 4 and 5. A housing 39, formed on or attached to the rim 37, is provided at its lower portion with a hollow bore adapted to receive the valve 38. This housing is provided with a port 40 communicating with the interior of the pan 4 and has an outlet 41 below the bottom of the pan. The valve 38 has the form of a hollow cylinder and is provided with a port 42, Figure 5, corresponding to the port 40. By rotating the valve 38, the port 42 may be brought into registry with the port 40, thereby establishing communication, through the interior of the valve cylinder, between the interior of the pan and the outlet 41. The outlet 41 is adapted to deliver its discharge to a trough 43 of annular form and mounted below the pan 4. This trough may be provided with an outlet 44, from which its contents may be drained in any suitable manner. A valve stem 45 passes upwardly through the housing 39 and is equipped at its upper end above the rim of the pan 4 with a crank arm, Figure 3, carrying at its end a cam roller 47.

Journaled in the spider 6 at a convenient point above the rim 37 of the pan is a short shaft 48 which carries at its lower end a cam member 49 and at its upper end a manipulating handle 50. By means of the handle 50 the cam 49 may be thrown into the path of the cam roller 47 as the pan rotates. The roller 47 during its rotation with the pan will then engage the cam 49 and be thrown to one side, upwardly as shown in Figure 3, thereby moving the arm 46 so as to rotate the valve stem 45 and turn the valve 38. With the parts in the position shown in Figure 3, the cam 49 will operate to open the valve 38 to cause the material to drain from the pan. By throwing the arm 50 upwardly, Figure 3, the arm 46 may be thrown in the opposite direction to close the valve 38.

In the operation of this pulverizer, the material to be ground is fed into the pan 4 by means of the feeder 36 or in any other suitable manner. Water or other liquid may be provided at a suitable rate by means of the conduit 51. The pan is rotated and the mullers rotated eccentrically on the shafts 7 at the same time. The material is ground between the blocks 9 and the plate 5. The pressure of the blocks 9 upon the plate may be adjusted to any desired value by means of the nuts 12. A series of plows 52 mounted on the spider 6 or any other suitable support are arranged to extend into the pan in order to stir up the material therein and prevent its being crowded by centrifugal force to the outer edge of the pan. These plows operate to feed the material continuously from the outer rim to the inner portion of the pan, where it is engaged by the various banks of mullers, during its passage outward again to the rim. A continual circulation of the material is thus provided. As the grinding proceeds and the material becomes pulverized to a proper degree of fineness, it passes into suspension in the liquid and floats to the top. As the liquid is continually supplied to the pan, it will continually overflow therefrom through the ports 28 and pass downwardly through the hollow shaft 3 and out of the pan. Thus a continuous process may be carried out, the material being fed in in a coarse state and washed out as soon as it attains the desired degree of fineness. The degree of fineness may be regulated by the specific gravity of the liquid upon which it is caused to float. The mullers, being eccentrically mounted on their shafts, execute a sweeping movement over the plate 5 which is very effective in increasing the rapidity of grinding, since all points of the grinding block 9 take part in the rotation. The balancing of the mullers on their shaft 7 insures against binding of these shafts due to unbalancing and provides for a reduced power consumption in driving the machine.

When it is desired to discontinue the operation the operator simply throws the handle 50 so as to throw the cam 49 into the path of the rollers 47. Thereupon each valve 38 as it passes the position of the cam 49 will be opened. The material is then drained through the valves 38 to the trough 43, so that there will be no tendency to cake and block the movement of the pan after the same has stopped.

Figure 2:
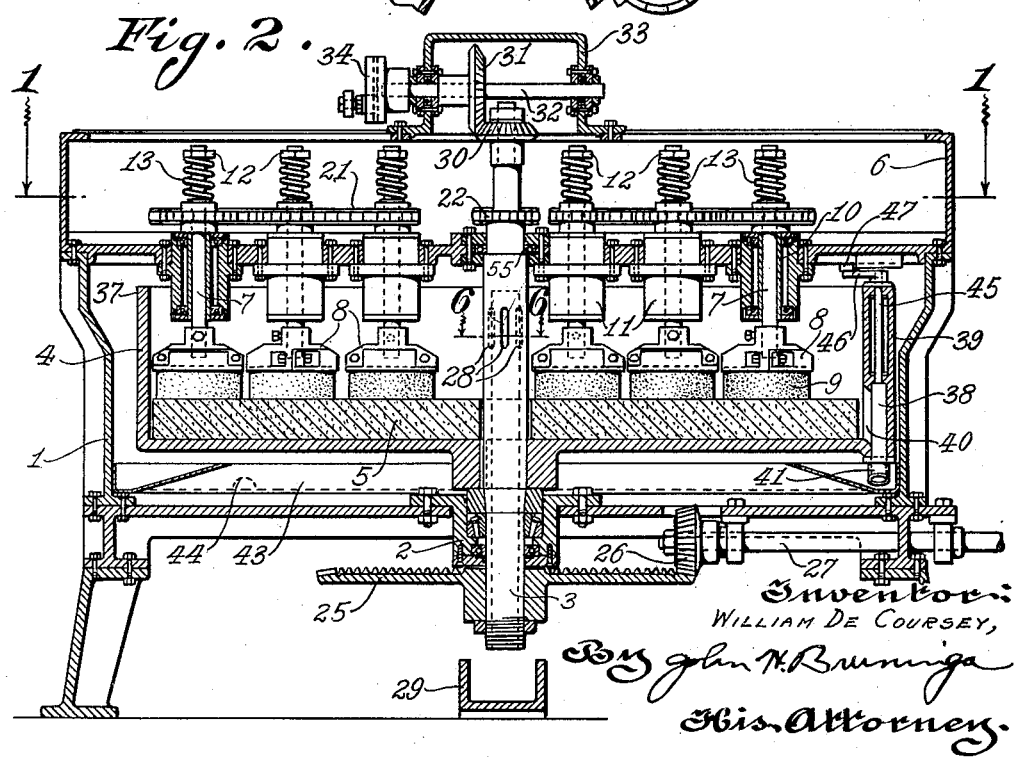
Figure 2 is a vertical section, taken on line 2—2 of Figure 1.
Figure 8:
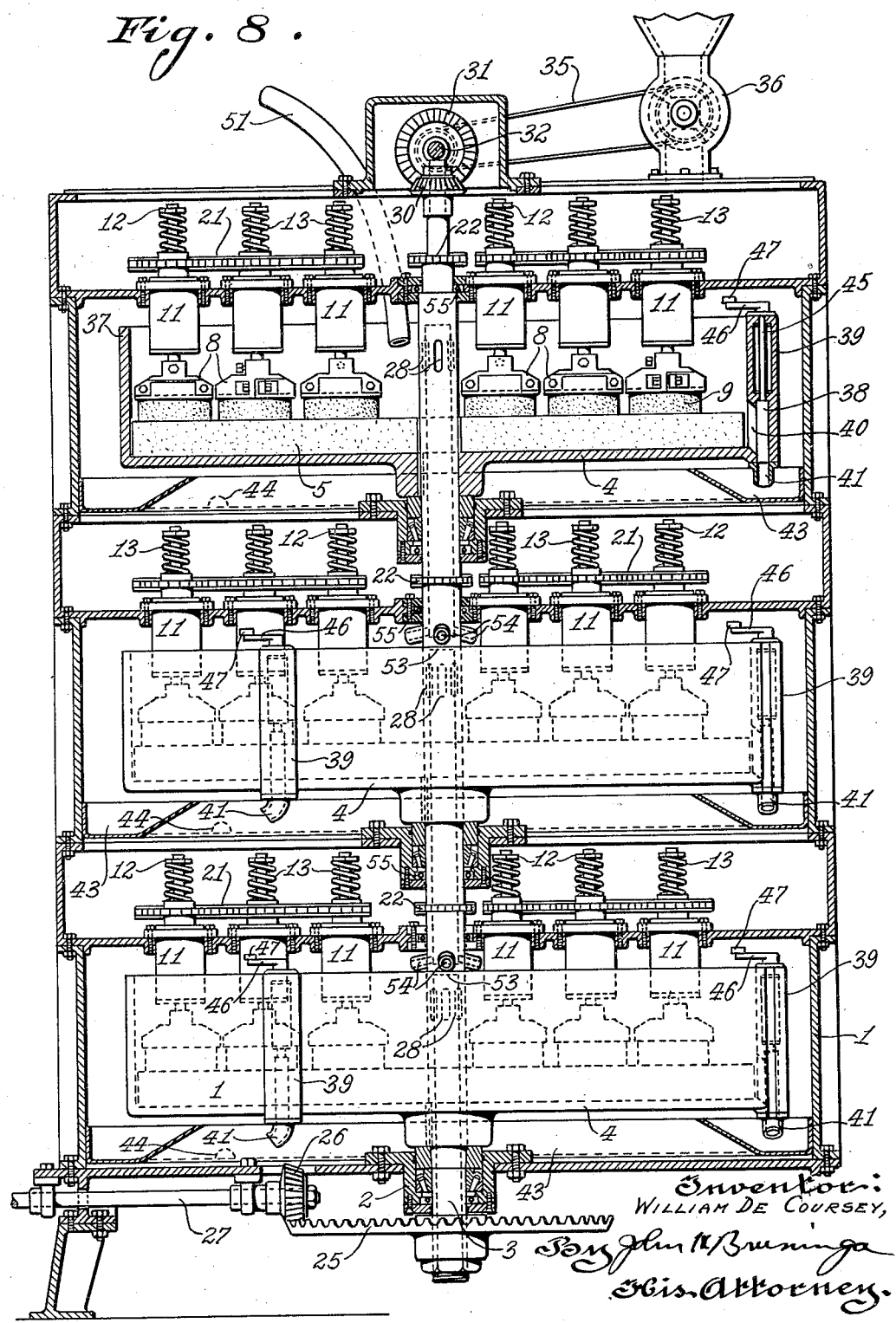
Figure 8 is a vertical sectional view showing another embodiment of this invention, in which a series of grinders are mounted in a vertical stack for successive operation on the material.

In the embodiment of Figure 8 a series of pulverizers, such as illustrated in Figures 1 and 2, are arranged in a vertical stack. Any number of machines may be so combined, three being shown in Figure 8. In this embodiment, the hollow shaft 3 passes upwardly through the entire stack, and all of the pans 4 are mounted thereon. The bore of the shaft 3 is in this case divided into sections corresponding to the number of pulverizer units by means of plugs between sections. Above each plug one or more outlets 54 are provided through which the upper section of the hollow shaft drains the discharge into the pan below. This arrangement provides for repeated grinding so that a greater degree of fineness may be attained. The different sets of mullers in the different pans may be adjusted to different pressures and the material is passed successively from one pan to the next and repeatedly ground.

It will be seen that this invention provides a pulverizer which is capable of a fine control so as to adjust the degree of fineness of grinding. The material floats through the machine in a continuous stream. The mullers, having been adjusted to the desired pressure, move with a sweeping motion over the plate 5 so as to utilize their entire grinding surface and thereby increase the amount of material ground. The ground material floats on the liquid and overflows, either passing out of the machine or passing to the next grinding stage.

By arranging the several pans above one another in the same structure and rotating on the same shaft a number of distinct advantages are realized. The combined unit occupies only the same amount of floor space that a single pan unit would occupy. By operating a plurality of units on the same shaft a considerable saving in driving power is effected so that the economy of operation is greatly improved. The vibration of the combined unit is less than for a single unit since any unbalancing effect in one pan tends to be neutralized by a corresponding effect in the opposite sense in other pans. The several grinding operations which are performed on the material in a definite succession follow each other downwardly thru the machine in the same succession. Each of these operations produces a new condition in the material so that the successive steps in the grinding process are carried out in successive pans. The finished product of one step is transferred automatically by gravity thru the hollow shaft to the next pan where the next step in the process is performed thereon.

A great saving in time and expense results from this arrangement of the machine. Such an arrangement is more easily handled by a single attendant than a plurality of individual machines would be.

When operation is discontinued, the trouble caused by the settling and caking of the material in the pan is entirely avoided by draining the pan while the same is still in motion. Accordingly, when the pan comes to rest it is empty and can again be started up without delay.

It is obvious that various changes may be made in the details of construction without departing from the spirit of this invention; it is to be understood, therefore, that this invention is not limited to the specific details shown and described.

Having thus described the invention, what is claimed is:

1. A wet pulverizer, comprising, a pan adapted for rotation and to contain a liquid, mullers cooperating therewith, a drain valve at the rim of said pan, and means for operating said valve while said pan is in motion, whereby the liquid may be drained off by centrifugal action.

2. A pulverizer comprising, an upper pan and cooperating grinding means, a lower pan and cooperating grinding means below said upper pan, and a hollow shaft driving both of said pans and providing an outlet from said upper pan discharging into said lower pan.

3. A pulverizer comprising, a pan, mullers cooperating therewith, and means for mounting said mullers for rotation in said pan including bearings, muller shafts mounted for flotation in said bearings and yielding supports for said mullers.

4. A pulverizer comprising, a pan, mullers cooperating therewith, and means for mounting said mullers for rotation in said pan including a muller shaft, a bearing in which said shaft is adapted to float, and a spring adapted to wholly or partly support the weight of the muller.

5. A pulverizer comprising, a pan, mullers cooperating therewith, and means for mounting said mullers for rotation in said pan including a muller shaft, a bearing in which said shaft is adapted to float, a spring adapted to wholly or partly support the weight of the muller, and means for adjusting said spring.

6. A pulverizer comprising, a pan, mullers cooperating therewith, and means for mounting said mullers for rotation in said pan including a muller shaft, a demountable bearing therefor, said shaft being mounted to float in said bearing and a yielding support for said muller.

7. A pulverizer comprising, a pan, mullers cooperating therewith, and means for mounting said mullers for rotation including a muller shaft, a sleeve, a bearing for said sleeve, and means for mounting said shaft to float in said sleeve.

8. A pulverizer comprising, a pan, mullers cooperating therewith, and means for mounting said mullers for rotation including a muller shaft, a sleeve, a demountable bearing for said sleeve, and means for mounting said shaft to float in said sleeve.

9. In a pulverizer, a muller comprising, a grinding block, and a holder therefor having an eccentric socket, said block being mounted in said socket.

10. In a pulverizer, a muller comprising, a grinding block, a holder therefor, said block being eccentrically mounted in said holder, and a counterweight on said holder.

11. In a pulverizer, a muller comprising, a muller shaft, a grinding block, and a split holder adapted to hold said block eccentrically and having a hub fitting said shaft.

12. In a pulverizer, a muller comprising, a muller shaft, a grinding block, a split holder adapted to hold said block eccentrically, and having a hub fitting said shaft, and a counterweight on said holder.

13. A wet pulverizer, comprising, an upper rotating pan and cooperating grinding means, a lower rotating pan and co-operating grinding means below said upper pan, a conduit in communication with, moving with and providing an outlet for said upper pan and discharging into said lower pan, and means for driving said pans in unison.

14. A pulverizer comprising, a plurality of pans mounted for rotation one above another, mullers cooperating with said pans, a vertical shaft driving said pans and said mullers, said shaft having a passage for conveying the ground material from one pan to the next.

In testimony whereof I affix my signature this 25th day of September, 1926.

WILLIAM DE COURSEY.